(12) United States Patent
Chen et al.

(10) Patent No.: US 11,943,782 B2
(45) Date of Patent: Mar. 26, 2024

(54) DATA CHANNEL TRANSMISSION METHOD AND TERMINAL DEVICE

(71) Applicant: GUANGDONG OPPO MOBILE TELECOMMUNICATIONS CORP., LTD., Guangdong (CN)

(72) Inventors: Wenhong Chen, Guangdong (CN); Zhihua Shi, Guangdong (CN); Yingpei Huang, Guangdong (CN)

(73) Assignee: Guangdong Oppo Mobile Telecommunications Corp., Ltd., Guangdong (CN)

( * ) Notice: Subject to any disclaimer, the term of this patent is extended or adjusted under 35 U.S.C. 154(b) by 439 days.

(21) Appl. No.: 17/391,746

(22) Filed: Aug. 2, 2021

(65) Prior Publication Data

US 2021/0360683 A1 Nov. 18, 2021

Related U.S. Application Data

(63) Continuation of application No. PCT/CN2019/079370, filed on Mar. 22, 2019.

(51) Int. Cl.
*H04W 72/0446* (2023.01)
*H04L 1/1867* (2023.01)
(Continued)

(52) U.S. Cl.
CPC .......... *H04W 72/23* (2023.01); *H04L 1/1896* (2013.01); *H04W 72/0446* (2013.01); *H04W 72/0453* (2013.01)

(58) Field of Classification Search
None
See application file for complete search history.

(56) References Cited

U.S. PATENT DOCUMENTS

| 11,832,264 B2* | 11/2023 | Xiong | H04L 5/0053 |
| 2019/0132845 A1* | 5/2019 | Babaei | H04L 1/1812 |
| 2019/0149305 A1* | 5/2019 | Zhou | H04L 5/0048 |
| | | | 370/330 |

(Continued)

FOREIGN PATENT DOCUMENTS

| CN | 102056299 A | 5/2011 |
| CN | 109041223 A | 12/2018 |

(Continued)

OTHER PUBLICATIONS

The EESR of corresponding European application No. 19921856.1, dated Nov. 24, 2021.

(Continued)

*Primary Examiner* — Duc T Duong
(74) *Attorney, Agent, or Firm* — Ladas & Parry LLP

(57) ABSTRACT

Embodiments of the present application relate to a data channel transmission method and a terminal device. The method includes: receiving, by a terminal device, first DCI configured to schedule a first data channel and second DC configured to schedule a second data channel, where the first data channel and second data channel are scheduled on the same time domain resource; or a time interval between the first data channel and second data channel is less than a first preset value, or the first DCI and the second DCI are transmitted on the same time domain resource, or a transmission time interval between the first DCI and the second DC is less than a second preset value, transmitting, by the terminal device, the first data channel and/or the second data channel on a bandwidth part BWP determined according to at least one DCI of the first DCI and the second DCI.

20 Claims, 7 Drawing Sheets

(51) Int. Cl.
  *H04W 72/0453* (2023.01)
  *H04W 72/23* (2023.01)
  *H04W 72/232* (2023.01)

(56) References Cited

U.S. PATENT DOCUMENTS

| | | | |
|---|---|---|---|
| 2019/0261405 A1* | 8/2019 | Ang | H04W 28/06 |
| 2019/0342907 A1* | 11/2019 | Huang | H04W 72/23 |
| 2020/0145164 A1* | 5/2020 | Cheng | H04W 52/265 |
| 2020/0205134 A1* | 6/2020 | Pan | H04W 72/12 |
| 2021/0167930 A1* | 6/2021 | Jeon | H04L 27/2607 |
| 2021/0297196 A1* | 9/2021 | Jiang | H04L 5/0044 |
| 2023/0379973 A1* | 11/2023 | Cirik | H04W 72/04 |

FOREIGN PATENT DOCUMENTS

| | | |
|---|---|---|
| CN | 109309550 A | 2/2019 |
| EP | 3809620 A1 | 4/2021 |
| WO | 2019050323 A1 | 3/2019 |
| WO | 2019050379 A1 | 3/2019 |

OTHER PUBLICATIONS

OPPO:"Enhancements on multi-TRP and multi-panel transmission", 3GPP Draft; R1-1902701, 3rd Generation Partnership Project (3GPP), Mobile Competence Centre; 650, Route Des Lucioles; F-06921 Sophia-Antipolis Cedex; France, vol. Ran WG1, No. Athens, Greece; Feb. 25, 2019-Mar. 1, 2019 Feb. 15, 2019(Feb. 15, 2019), XP051600396.

Mediatek Inc:"Enhancements on multi-TRP/panel transmission", 3GPP Draft; R1-1901789 Enhancements on Multi-Trppanel Transmission, 3rd Generation Partnership Project (3GPP), Mobile Competence Centre; 650, Route Des Lucioles; F-06921 Sophia-Antipolis Cedex; Fran. vol. RAN WG1, No. Athens, Greece; Feb. 25, 2019-Mar. 1, 2019 Feb. 16, 2019(Feb. 16, 2019), XP051599483.

International Search Report (ISR) dated Sep. 27, 2019 for Application No. PCT/CN2019/079370.

\* cited by examiner

DATA CHANNEL TRANSMISSION METHOD AND TERMINAL DEVICE

CROSS-REFERENCE TO RELATED APPLICATION

This application is a continuation of International Application No. PCT/CN2019/079370, filed on Mar. 22, 2019, the disclosure of which is hereby incorporated by reference in its entirety.

TECHNICAL FIELD

The present application relates to the field of communications, and more particularly, to a data channel transmission method and a terminal device.

BACKGROUND

Downlink and uplink non-coherent transmission based on multiple transmission/reception points (TRP) scheduling is introduced in NR systems. In downlink and uplink non-coherent transmission, different TRPs can independently schedule the same terminal to transmit data channels. If the terminal is scheduled for non-coherent transmission, the data channels scheduled by two received downlink control information (DCI) may be required to be transmitted at the same time. Since different pieces of DCI come from different TRPs, Bandwidth Part (BWP) indication fields therein may indicate the same BWP or different BWPs, so how to transmit or receive the data channel by the terminal is an urgent problem to be solved.

SUMMARY

Embodiments of the present application provide a data channel transmission method and a terminal device, which can reduce the complexity of the terminal device and improve the transmission efficiency.

In a first aspect, there is provided a data channel transmission method, including: receiving, by a terminal device, first downlink control information DCI and second DCI, where the first DCI is configured to schedule a first data channel, the second DCI is configured to schedule a second data channel, and the first DCI, the second DCI, the first data channel and the second data channel satisfy one of the following conditions: the first data channel and the second data channel are scheduled on a same time domain resource: a time interval between the first data channel and the second data channel is less than a first preset value, the first DCI and the second DCI are transmitted on a same time domain resource; a transmission time interval between the first DCI and the second DCI is less than a second preset value; transmitting, by the terminal device, the first data channel and/or the second data channel on a bandwidth part BWP determined according to at least one DCI of the first DCI and the second DCI.

In a second aspect, there is provided a terminal device, which is configured to execute the method according to various implementation forms of the first aspect or the first aspect as such. Specifically, the terminal device includes a functional module for executing the method according to various implementation forms of the first aspect or the first aspect as such.

In a third aspect, there is provided a terminal device, including: a processor and a memory, where the memory is configured to store a computer program, and the processor is configured to call and run the computer program stored in the memory to execute the method according to various implementation forms of the first aspect or the first aspect as such.

In a fourth aspect, there is provided a chip, which is configured for executing the method according to various implementation forms of any one of the above-mentioned first to second aspects or the first to second aspects as such. Specifically, the chip includes: a processor, configured to call and run a computer program from a memory, so that a device installed with the chip executes the method according to various implementation forms of any one of the above-mentioned first to second aspects or the first to second aspects as such.

In a fifth aspect, there is provided a computer program product including computer program instructions that cause a computer to execute the method according to various implementation forms of any one of the above-mentioned first to second aspects or the first to second aspects as such.

According to the above technical solution, considering that in a scenario of incoherent transmission, for example, the terminal device may be scheduled on different BWPs by different TRPs, the terminal device simply needs to send or receive multiple data channels on one BWP, instead of sending or receiving signals on multiple BWPs at the same time, thus reducing the implementation complexity of the terminal device and ensuring that the data channel which is more important can be preferentially transmitted, for example, ensuring that data from a serving cell can be preferentially transmitted.

DESCRIPTION OF EMBODIMENTS

In the following, the technical solution of the embodiments of the present application will be described with reference to the accompanying drawings of the embodiments of the present application. Obviously, the described embodiments are part of the embodiments of the present application, not all of them. Based on the embodiments of the present application, all other embodiments obtained by ordinary technicians in this field without paying creative labor belong to the protection scope of the present application.

The embodiments of the present application can be applied to various communication systems, such as a global system of mobile communication (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communication system or a 5G system.

Figure 1:
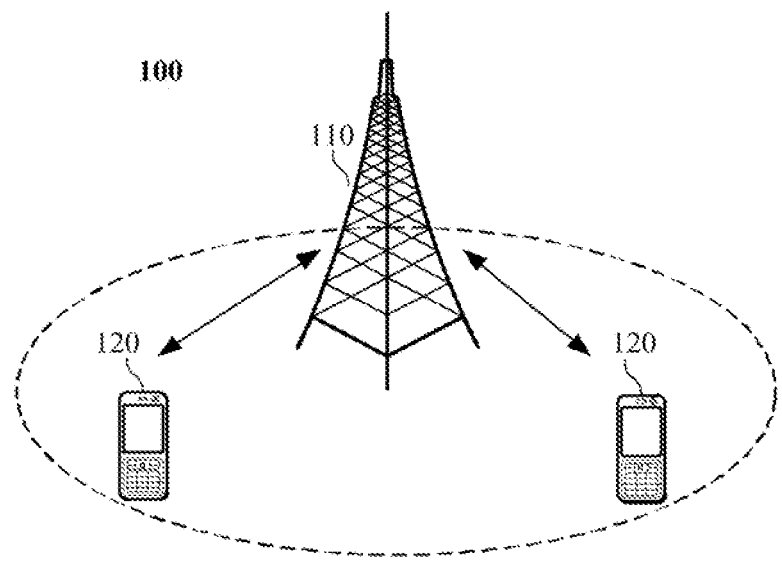
FIG. 1 is a schematic diagram of a communication system architecture provided by an embodiment of the present application.

Illustratively, a communication system 100 applied in the embodiment of the present application is shown in FIG. 1. The communication system 100 may include a network device 110, which can communicate with a terminal device 120 (called a communication terminal or terminal), provides communication for a specific geographic area, and communicates with terminal devices located in this area. Optionally, the network device 110 can be a base transceiver station (BTS) in a GSM or CDMA system, a base station (NodeB, NB) in a WCDMA system, an Evolutional NodeB (eNB or eNodeB) in an LTE system, or a wireless controller in a cloud radio access network (CRAN). The network device 110 can be a mobile switching center, a relay station, an access point, a vehicle-mounted device, a wearable device, a hub, a switch, a bridge, a router, a network device in a 5G network, or a network device in a public land mobile network (PLMN) in the future evolution.

The communication system 100 also includes at least one terminal device 120 located within the coverage range of the network device 110. The terminal device used here include but is not limited to devices that are connected through wired connections such as public switches telephone networks (PSTN), digital subscriber line (DSL), digital cables, and direct cable connections; and/or another data connection/network; and/or via wireless interfaces, such as, cellular networks, wireless local area network (WLAN), digital television networks such as DVB-H networks, satellite networks, and AM-FM radio transmitters; and/or a device of another terminal device configured to receive/transmit communication signals: and/or Internet of Things (IoT) devices. A terminal device configured to communicate through a wireless interface may be referred to a "wireless communication terminal", "wireless terminal", or "mobile terminal". Examples of mobile terminals include but not limited to, satellite or cellular phones; personal communications system (PCS) terminals that combine cellular radiotelephony with data processing, facsimile, and data communication capabilities; PDA of radiophones, pagers, Internet/Intranet access, Web browsers, notebooks, calendars, and/or global positioning system (GPS) receivers; and conventional lap and/or palmtop receivers or other electronic devices including radio-telephone transceivers. The terminal device may refer to an access terminal, a user equipment (UE), a user unit, a user station, a mobile station, a remote station, a remote terminal, a mobile equipment, a user terminal, a terminal, a wireless communication equipment, a user agent or a user device. The access terminal may be a cellular phone, a cordless phone, a session initiation protocol (Session Initiation Protocol, SIP) phone, a wireless local loop (Wireless Local Loop, WLL) station, a personal digital assistant (PDA), a handheld or compute device with wireless communication capabilities, other processing devices connected to wireless modems, an in-vehicle device, a wearable device, a terminal in a 5G network or a terminal device in a PLMN in the future.

Optionally, direct Device to Device (D2D) communication can be conducted between terminal devices 120.

Optionally, 5G systems or networks can also be referred to as new radio (NR) systems or NR networks.

FIG. 1 illustrates an example of a network device and two terminal devices. Optionally, the communication system 100 can include multiple network devices and the coverage of each network device can include an additional number of terminal devices, which is not limited by this embodiment.

Optionally, the communication system 10t can also include other network entities such as network controllers, mobile management entities, which are not limited by this embodiment.

It should be understood that devices that have communication functions in the network/system in the embodiments of the present application are referred to as communication devices. Taking the communication system 100 shown in FIG. 1 as an example, the communication devices may include the network device 110 and the terminal device 120. They both can be specific devices mentioned above, which will not be described here. The communication devices may also include other devices in the communication system 100, such as network controllers, mobile management entities, and other network entities, which are not limited in the embodiments of the present application.

It should be understood that terms "system" and "network" used here are interchangeable, and the term "and/or" indicates relationships between associated objects. For example, A and/or B can mean that only A is available, both A and B are available, and only B is available. In addition, the character "/" used here generally indicates that the objects before and after "/" is in an OR relationship.

A few technical terms are explained in the following.

I. Uplink and Downlink Non-Coherent Transmission

Incoherent downlink and uplink transmission based on multiple TRPs is introduced in the NR system. The backhaul connection between TRPs can be ideal or non-ideal. If the backhaul is ideal, information is quickly and dynamically exchanged among multiple TRPs. If the backhaul is not ideal, due to the large time delay, information exchange between multiple TRPs can only be quasi-static.

In downlink incoherent transmission, multiple TRPs can use different control channels to schedule physical downlink shared channel (PDSCH) transmission of the same terminal device independently, and the scheduled PDSCH can be transmitted in the same time slot or in different time slots. The terminal device needs to simultaneously receive physical downlink control channels (PDCCH) and PDSCHs from different TRPs.

Figure 2:
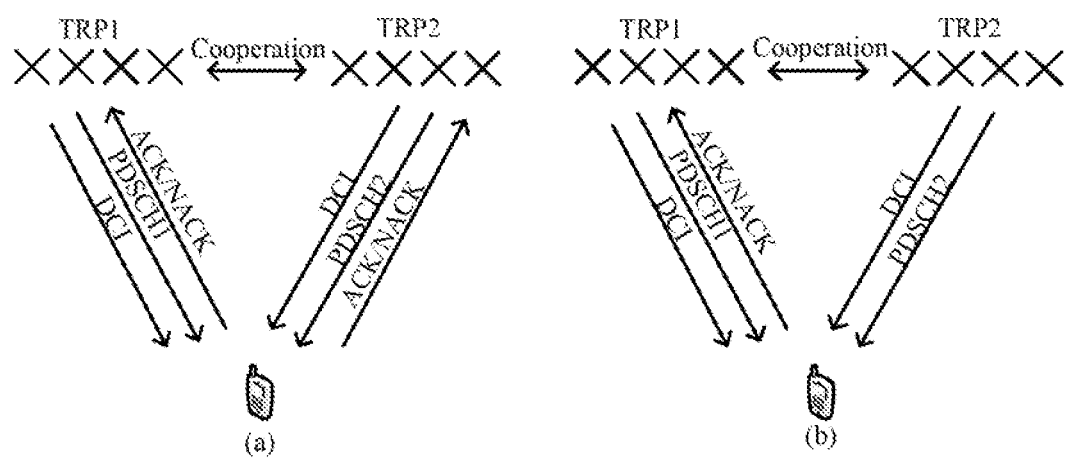
FIG. 2 is a schematic diagram of a terminal device feeding back ACK/NACK information according to an embodiment of the present application.

FIG. 2 is a schematic diagram of a terminal device feeding back acknowledgment/negative acknowledgment (ACKnowledgment/Negative ACKnowledgment, ACK/NACK)

information. When feeding back ACK/NACK information, the terminal device can feed back the ACK/NACK information to different TRPs that transmit corresponding PDSCHs, respectively, as shown in the figure on the left side of FIG. 2, i.e., FIG. 2(a), or can also merge and report the ACK/NACK information to one TRP, as shown in the figure on the right side of FIG. 2, i.e., FIG. 2(b). The former can be used in both ideal backhaul and non-ideal backhaul scenarios, while the latter can only be used in ideal backhaul scenarios.

PDSCHs sent by different TRPs can carry the same data, so the reliability of PDSCH transmission can be further improved through the diversity transmission among TRPs. At this point, the terminal device simply needs to report one piece of ACK/NACK information for multiple PDSCHs carrying the same data.

Figure 3:
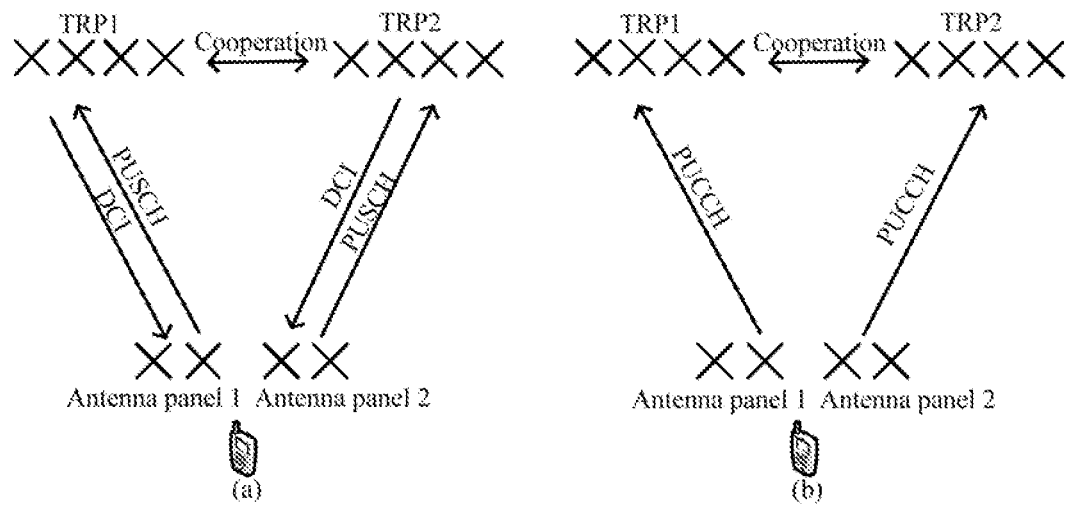
FIG. 3 is a schematic diagram of a terminal device including multiple antenna panels provided by an embodiment of the present application.

In uplink incoherent transmission, different TRPs can also schedule physical uplink shared channel (PUSCH) transmission of the same terminal independently. Different PUSCH transmissions can be configured with independent transmission parameters, such as beams, precoding matrixes, number of layers and the like. Scheduled PUSCH transmissions can be transmitted at the same time slot or at different time slots. If the terminal is scheduled for two PUSCH transmissions at the same time slot, it needs to determine how to perform the transmission according to its own capacity. If the terminal is configured with multiple panels and supports simultaneous PUSCH transmissions on multiple panels, the two PUSCHs can be transmitted at the same time, and different PUSCHs transmitted on different panels are aligned with corresponding TRPs for analog forming. As a result, different PUSCHs are distinguished in the spatial domain and uplink spectrum efficiency is achieved, as shown in the figure on the left side of FIG. 3, i.e., FIG. 3(a). If the terminal has only one panel, or does not support simultaneous transmission on multiple panels, then PUSCH can only be transmitted on one panel, as shown in the figure on the right side of FIG. 3, i.e., FIG. 3(b).

II. BWP Switching

In NR systems, the system bandwidth and terminal bandwidth may reach hundreds of megahertz (MHz) or even several gigahertz (GHz) to support high-speed mobile data transmission. However, in actual data transmission, such a large bandwidth is not required all the time. For example, in scenarios where only low data rate transmission (such as chat on WeChat) is required, a small working bandwidth, such as 10 MHz, is enough.

Figure 4:
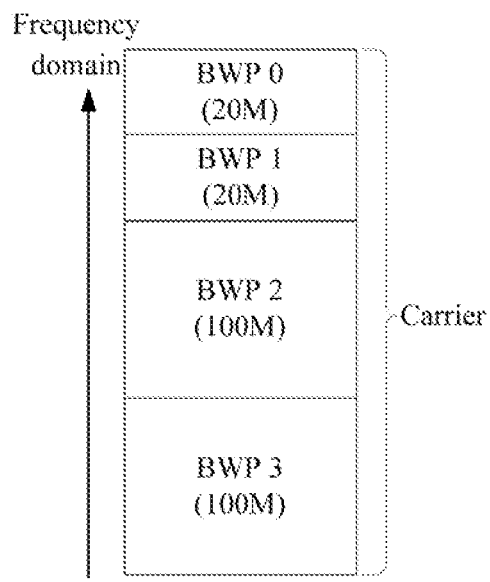
FIG. 4 is a schematic diagram of a BWP provided by an embodiment of the present application.

In order to flexibly support different bandwidth requirements in different scenarios, the concept of bandwidth part (BWP) is introduced in 5G. The bandwidth part can be a part of the system bandwidth. For example, if the system bandwidth is 100 MHz, the terminal can use a bandwidth less than 100 MHz, such as 20 MHz or 50 MHz, to transmit data within the system bandwidth. NR supports simultaneous configuration of up to four downlink BWPs and four uplink BWPs for the terminal. Different BWPs can have different bandwidth sizes, frequency locations, and sub-carrier intervals. For example, the four BWPs shown in FIG. 4 can be configured for a terminal device. The network can make the terminal switch between multiple BWPs according to the business requirements of the terminal, for example, the BWP with a larger bandwidth is used for higher rate service transmission, and the BWP with a smaller bandwidth is used for lower rate service transmission rate.

Currently, NR supports carrying a BWP part indicator (Bandwidth pan indicator) field in DC for scheduling data of the terminal. The size of this field can be 0, 1, or 2 bits depending on the number of BWPs configured for the terminal by the system ($n_{BWP,RRC}$). The length of bits is $n_{BWP}=n_{NWP,RRC}+1$, where, if $n_{NWP,RRC} \leq 3$, then $n_{BWP}=n_{BWP,RRC}+1$. The BWP pan indicator is the same as the BWP Identifier (BWP-Id) configured through high-level parameters. For other cases, $n_{BWP}=n_{BWP,RRC}$, and see the table below for the BWP part indicator

| Value of BWP indicator field 2 bits | Bandwidth part |
|---|---|
| 00 | First BWP configured through the high-level signaling |
| 01 | Second BWP configured through the high-level signaling |
| 10 | Third BWP configured through the high-level signaling |
| 11 | Fourth BWP configured through the high-level signaling |

When it is necessary to switch the BWP of the terminal, and the BWP in the BWP part indicator field of DCI sent by the network to the terminal is different from the BWP where the terminal is currently located, the terminal executes the BWP switching after receiving the BWP part indicator field.

In NR, the aforementioned BWP part indicator field can be carried in DCI format 0-1 and in DCI format 1-1. DCI format 0-1 is an uplink scheduling grant that can be used for indicating uplink BWP switching. DCI format 1-1 is the downlink scheduling grant that can be used for indicating the downlink BWP switching.

Figure 5:
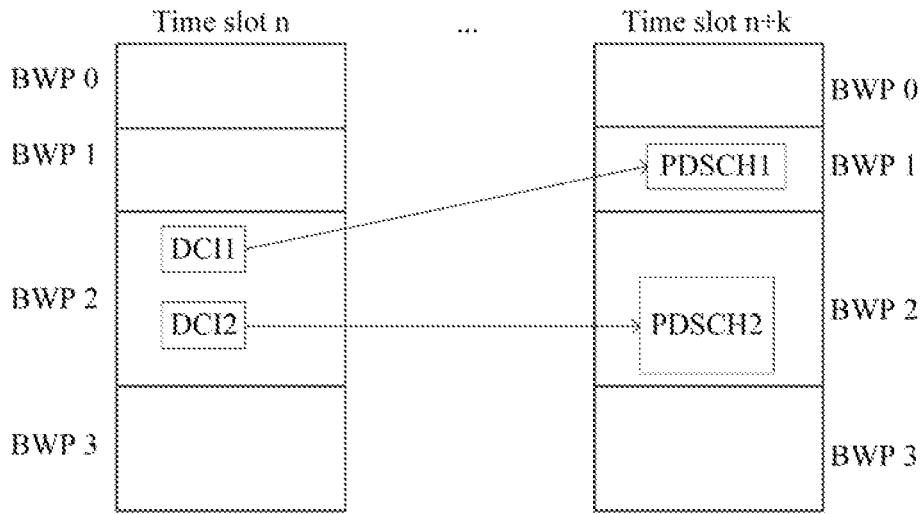
FIG. 5 is a schematic diagram of scheduling PDSCH through different pieces of DCI provided by an embodiment of the present application.

In an NR system, a terminal is neither able to send nor to receive signals on multiple BWPs at the same time. If the terminal is scheduled for incoherent transmission, the received data channels scheduled separately by two pieces of DCI may be transmitted at the same time. Since different pieces of DCI come from different TRPs, it is difficult to guarantee that the BWP part indicator fields therein indicate the same BWP, especially in the case of non-ideal backhauls. If BWPs indicated by two pieces of DCI are different, as shown in FIG. 5, DCI1 instructs the terminal device to use BWP1 to transmit PDSCH1, while DCI2 instructs the terminal device to use BWP2 to transmit PDSCH2. Among them, BWP1 and BWP2 are different, that is, the terminal needs to send or receive signals on multiple BWPs at the same time, which will significantly increase the complexity of the terminal. At this time, how the terminal determines which BWP to send or receive the data channel is a problem that needs to be solved.

For example, in order to ensure that the BWP used by the terminal for transmission is unique, only one BWP can be configured through high-level signaling on the network side, thus avoiding different BWPs. However, the flexibility of this method is too poor since flexible scheduling cannot be implemented with multiple BWPs.

Therefore, the embodiment of the present application provides a data channel transmission method, in which: when a terminal is scheduled to send or receive two data channels simultaneously, it determines to send or receive data channels on which BWP according to the BWP part indicator contained in at least one of the two DCI that schedule the two data channels.

Figure 6:
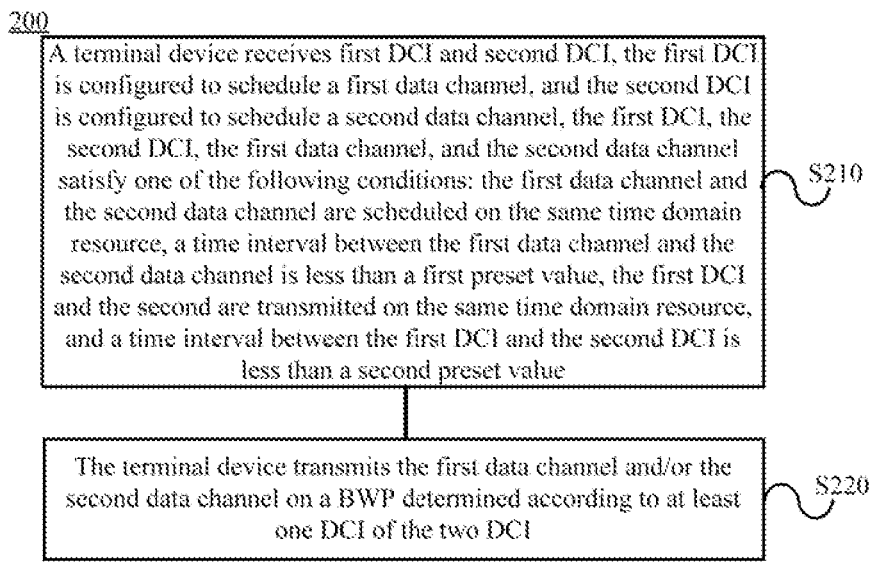
FIG. 6 is a schematic diagram of a data channel transmission method provided by an embodiment of the present application.

FIG. 6 is a schematic diagram of a data channel transmission method (Method 200) provided by the embodiment of the present application. Method 200 can be performed by a terminal device. The terminal device could be the one shown in FIG. 1. As shown in FIG. 6, Method 200 includes: S210, the terminal device receives first DCI and second DCI. The first DCI is configured to schedule a first data channel, and the second DCI is configured to schedule a second data channel. The first DCI, the second DCI, the first data channel, and the second data channel satisfy one of the following conditions: the first data channel and the second data channel are scheduled on the same time domain resource, a time interval between the first data channel and the second data channel is less than a first preset value, the first DCI and the second are transmitted on the same time domain resource, and a time interval between the first DCI and the second DCI is less than a second preset value. S220, the terminal device transmits the first data channel and/or the second data channel on a BWP determined according to at least one DC of the two DCI.

In the embodiment of the present application, the transmitting a data channel includes: receiving and/or sending the data channel, that is, the transmission of the data channel may be either sending or receiving the data channel. For example, the terminal device transmits the first data channel, which means that the terminal device sends the first data channel or receives the first data channel.

In addition, in the embodiment of the present application, transmitting a data channel refers to the transmission of data carried by the data channel. For example, in the embodiment of the present application, the terminal device transmits the first data channel, that is, the terminal device receives or transmits the data carried by the first data channel, which will not be repeated for the sake of conciseness.

In S210, the terminal device receives the first DCI and the second DCI. The first DCI is configured to schedule the first data channel, and the second DCI is configured to schedule the second data channel. The first data channel and the second data channel can both be uplink channels, downlink channels, or one can be a downlink channel, while the other can be an uplink channel. For example, the first data channel is an uplink channel PUSCH, and the second data channel is a downlink channel PDSCH. The embodiment of the present application is not limited thereto.

Considering that if pieces of DCI are from the same TRP or associated with the same control-resource set (CORESET), generally, the terminal device will not be scheduled on two different BWPs at the same time. However, in the case of incoherent transmission, the terminal device may be scheduled on different BWPs by different TRPs. Therefore, the embodiment of the present application can not only be applied to the scenario where the first DCI and the second DCI are respectively associated with the same CORESET, but also to the scenario where the first DCI and the second DCI are respectively associated with different CORESETs.

For the scenario where the first DCI and the second DCI are associated with different CORESETs, the terminal device detects the first DCI in a first CORESET and the second DCI in a second CORESET. The first CORESET and second CORESET are two CORESETs pre-configured for the terminal device on the network device side. By associating with different CORESETs, the first DCI and second DCI can come from different TRPs, that is, the terminal device receives the first DCI sent by a first network device and the second DCI sent by a second network device. The first network device and the second network device are different network devices, that is, the terminal device can obtain the first DCI and the second DCI from two independent PDCCHs. Correspondingly, a search space where the first DC is located can also be the same as or different from a search space where the second DCI is located.

In the embodiment of the present application, Method 200 may also include: the terminal device determines a time domain resource of the first data channel according to time domain resource configuration information in the first DCI, and determines a time domain resource of the second data channel according to time domain resource configuration information in the second DCI. The first DCI, the second DCI, the first data channel, and the second data channel satisfy one of the following conditions: the time domain resources of the first data channel and the second data channel may be the same, the time interval between the first data channel and the second data channel is less than the first preset value, the first DCI and the second DC are transmitted on the same time domain resource, the transmission time interval between the first DCI and the second DCI is less than the second preset value.

In particular, in the case where the time domain resources of the first data channel and the second data channel may be the same, or in other words, the first data channel and the second data channel are scheduled on the same time domain resource, or, time domain resources for transmitting the first DCI and the second DCI are the same, where the time domain resource can be a time slot or an orthogonal frequency division multiplexing (OFDM) symbol. Specifically, the first data channel and the second data channel being scheduled on the same time domain resource means that: the time domain resource of the first data channel and the time domain resource of the second data channel may partially or completely overlap. Similarly, the time domain resource for transmitting the first DCI and the time domain resource for transmitting the second DC being the same means that: the time domain resource occupied by the PDCCH carrying the first DCI and the time domain resource occupied by the PDCCH carrying the second DCI can partially or completely overlap. For example, the first data channel and the second data channel occupy at least one OFDM symbol in common. For another example, the transmission resource for the first DCI and the transmission resource for the second DCI occupy at least one OFDM symbol in common. For another example, the first data channel and the second data channel can be scheduled in the same time slot, or the first DCI and the second DCI can be transmitted in the same time slot, but the OFDM symbols occupied by respective DCI in the same time slot can be different, partially overlapped, or completely overlapped.

In addition, in the case where the time interval between the first data channel and the second data channel is less than the first preset value, or the transmission time interval between the first DCI and the second DCI is less than the second preset value, the first preset value or the second preset value can be a pre-configured value on the network device side, or a threshold reported by the terminal device through capability reporting, or a fixed value agreed by the terminal device and network device in advance. For example, if the first data channel and the 20 second data channel are PDSCHs or PUSCHs, different values may be used as the first preset value.

Specifically, the first or second preset value can be set according to actual needs. For example, the first or second preset value can be the shortest length of time required for the terminal device to switch a BWP. The length of time could be a BWP switching threshold reported by the terminal device through UE capability reporting. In addition, the time interval between the first data channel and the second data channel or the first preset value can be in the unit of OFDM symbol or time slot. Similarly, the transmission time interval between the first DC and the second DCI or the second preset value may be in the unit of OFDM symbol or time slot, too. Where, if the time interval between the first data channel and the second data channel is 0, it means that the first data channel and the second data channel are scheduled on the same time domain resource; if the transmission time interval between the first DCI and the second DCI is 0, it means that the first DCI and the second DCI are transmitted on the same time domain resource.

Optional, based on the above preset first or second value, the first DCI, the second DCI, the first data channel, and the second data channel may also satisfy the following conditions: the time interval between the first data channel and the second data channel is less than or equals to the first preset value, or, the time interval between the first DCI and the second DCI is less than or equals to the second preset value, but the embodiment of the present application is not limited thereto.

In S220, the terminal device transmits the first data channel and/or the second data channel on a BWP determined by at least one DCI of the first DCI and the second DCI. This step is described in detail for different situations in combination with specific embodiments below.

Optionally, as a first embodiment, in S220, the terminal device determines either the first DCI or the second DCI as a target DCI; and the terminal transmits the first data channel and the second data channel on a target BWP determined according to the target DCI. Where the first data channel and the second data channel are both uplink channels or downlink channels.

For example, if the terminal device determines the first DCI as the target DCI, then the terminal device determines a corresponding first BWP according to the first DCI, and uses the first BWP to transmit the first data channel and the second data channel. Where the terminal device determines the first BWP according to the first DCI includes: the terminal device determines the first BWP according to a BWP indicator in the first DCI, or, if the first DCI does not include a BWP indicator, the terminal device determines a currently activated BWP as the first BWP.

It should be understood that in the first embodiment, if another DCI in the first DCI and the second DCI other than the target DCI contains a BWP indicator, the terminal device may not apply this indicator, regardless of whether this indicator is the same as the indicator in the target DCI.

Figure 7:
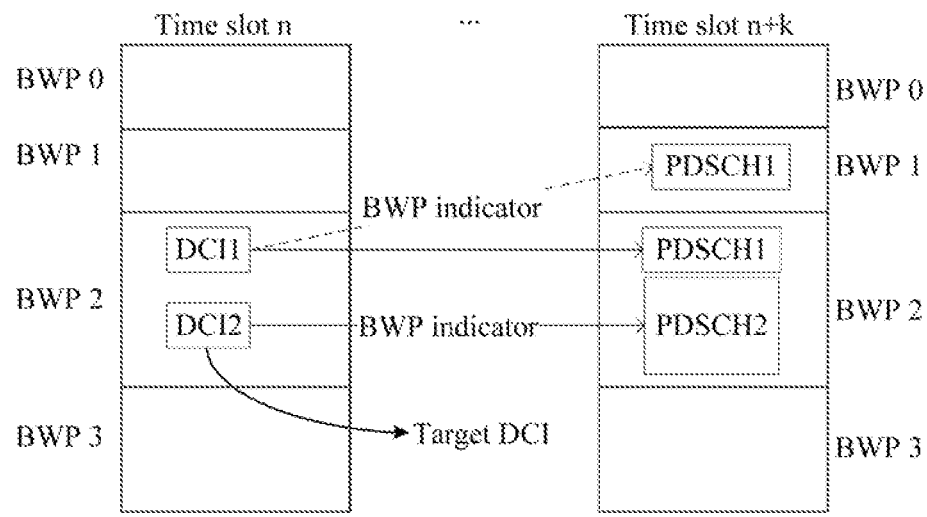
FIG. 7 is a schematic diagram of PDSCH transmission in a first embodiment of the present application.

FIG. 7 is a schematic diagram of PDSCH transmission in the first embodiment. Assume that the BWP indicator in DCI1 for scheduling PDSCH1 is BWP1, the BWP indicator in DCI2 for scheduling PDSCH2 is BWP2, and assume that the terminal device determines DCI2 as the target DCI, then the terminal device receives PDSCH1 and PDSCH2 in BWP2 instead of in BWP1.

It should be understood that if the first data channel and the second data channel are both PDSCHs, the terminal device uses the BWP determined through the target DCI to transmit the first data channel and the second data channel. Meanwhile, the terminal device can also determine, according to the target DCI, a BWP for transmitting ACK/NACK information of the first data channel and the second data channel, that is, the terminal device can use the same BWP to send the ACK/NACK information of the first data channel and the second data channel. Specifically, Method 200 also includes: the terminal device determines a feedback BWP according to the target DCI; and the terminal device sends the ACK/NACK information of the first data channel and the ACK/NACK information of the second data channel on the feedback BWP. The ACK/NACK information of the first data channel and the ACK/NACK information of the second data channel can be sent on different PUCCH resources.

For example, if the first DCI is the target DCI, the ACK/NACK information of the PDSCH scheduled by the first DCI is transmitted on BWP1, then the ACK/NACK information of the PDSCH scheduled by the second DCI should also be transmitted on BWP1, and it is unnecessary to make determination according to the second DCI.

It should be understood that the terminal device may use one or more ways to determine the target DC in the first DCI and the second DCI. For example, the terminal device adopts one or more of the following manners.

Manner 1: the terminal device determines, in the first DCI and the second DCI, DCI corresponding to a preset control-resource set (CORESET) as the target DCI.

Specifically, the terminal device can adopt DCI detected in the agreed CORESET as the target DCI. For example, if the terminal device is configured with multiple CORESETs for scheduling data transmission, the DCI detected in the first CORESET configured can be used as the target DCI. This approach requires no additional signaling overhead and guarantees a high priority for the serving cell. For example, if the DCI detected in the first CORESET is the first DCI, the terminal device determines the first DCI as the target DCI.

Manner 2: the terminal device determines the target DCI according to configuration information of a CORESET associated with the first DCI and configuration information of a CORESET associated with the second DCI.

Specifically, each CORESET can include indication information indicating whether the CORESET is a main CORESET, or indicating a priority of the CORESET. Based on such indication information, the terminal device can determine whether the DCI detected in the CORESET is the target DCI. For example, the terminal device can take the DCI in the main CORESET or the DCI in the CORESET with a higher priority as the target DCI. For example, if the CORESET corresponding to the first DCI has a higher priority, or the CORESET corresponding to the first DCI is the main CORESET, the terminal device will determine the first DCI as the target DCI.

The above indication information included in the CORESET can be indicated in the CORESET configuration via radio resource control (RRC) signaling.

Optionally, whether the DCI in the CORESET is the target DCI can also be implicitly indicated through other information in the CORESET.

By determining the target DCI in this way, the network side can indicate the terminal device which CORESET corresponds to the main serving cell through the CORESET configuration, so that the terminal device only adopts the BWP indicated by the main serving cell.

Manner 3: the terminal device determines the target DCI according to an identifier (ID) or index of the CORESET associated with the first DCI and an identifier (ID) or index of the CORESET associated with the second DCI.

Specifically, the terminal device can be preconfigured with multiple CORESETs, and each CORESET has its own ID or index. The terminal device conducts DCI detection in the search space associated with each CORESET, and the CORESET where the first DCI is detected to be located and the CORESET where the second DCI is detected to be located can be different.

The terminal device determines a CORESET with a lower CORESET ID or CORESET index from the CORESET in which the first DCI is detected and the CORESET in which the second DCI is detected, and determines the DCI in this CORESET as the target DCI. For example, if the index of the CORESET in which the first DCI is detected is lower than the index of the CORESET in which the second DCI is detected, the terminal device will determine the first DCI as the target DCI.

In another implementation, the target DC can also be DCI in a CORESET with a higher CORESET ID or CORESET index.

Manner 4: the terminal device determines the target DCI according to the ID or index of the search space where the first DCI is located and the ID or index of the search space where the second DCI is located.

Similar to Manner 3, the terminal device can be preconfigured with multiple search spaces, and each space has its own ID or index. The terminal device conducts DCI detection in each search space. The search space where the first DCI is located can differ from the search space where the second DCI is located. Therefore, the terminal device can determine a search space with a lower search space ID or search space index from the search space in which the first DCI is detected and the search space in which the second DCI is detected, and takes the DCI in this search space as the target DCI. For example, if the index of the search space in which the first DCI is detected is lower than the index of the search space in which the second DCI is detected, the terminal device determines the first DCI as the target DCI.

In another implementation, it is also possible to take the DCI in a search space with a higher search space ID or search space index as the target DCI.

Manner 5: the terminal device determines the target DCI according to a time sequence of receiving the first DCI and the second DCI.

Specifically, the terminal device determines, in the first DCI and the second DCI, the first received DCI as the target DCI. For example, if the terminal device first receives the first DCI and then receives the second DCI, then the terminal device will determine the first DCI as the target DCI.

In another implementation, the later received DCI can also be determined as the target DCI.

The sequence in which the DCI is received can be determined according to the time slot or OFDM symbol in which the DCI is detected.

Manner 6: the terminal device determines the target DCI according to a time sequence of transmitting the first data channel and transmitting the second data channel.

Specifically, the terminal device can determine DCI of a data channel with an earlier scheduling time as the target DCI. For example, both the first data channel and the second data channel are uplink channels, if the sending time of the first data channel is earlier than that of the second data channel, the terminal device determines the first DCI that schedules the first data channel as the target DCI.

In another implementation, the DC of the data channel with a later scheduling time can also be determined as the target DCI.

The sequence of transmitting the first data channel and transmitting the second data channel can be determined according to time slots or OFDM symbols occupied by the data channels.

Manner 7: the terminal device determines the target DCI according to the format of the first DCI and the format of the second DCI.

Specifically, when the format of the first DCI is different from that of the second DCI, the terminal device can choose the DCI of format 1-0 or format 0_0 as the target DCI. Alternatively, the terminal device may take DCI of format 1-1 or format 0_1 as the target DCI, and the embodiment of the present application is not limited to thereto.

Since data scheduled by DCI of format 1-0 and format 0_0 has a higher probability of correct detection and is usually of higher importance, thus, using the DCI of format 1-0 and format 0_0 as the target DCI can avoid unnecessary retransmission and reduce the delay of important data.

Manner 8: the terminal device determines the target DCI according to scrambling modes of cyclic redundancy check (CRC) codes of the first DCI and the second DCI.

If the first DCI uses the modulation and coding scheme (MCS)—the cell radio network temporary identifier (C-RNTI) for scrambling, and the second DCI uses C-RNTI or configured grant radio network temporary identity (CS-RNTI) for scrambling, then the terminal device can determine the first DCI scrambled with the MCS-C-RNTI as the target DCI.

For another example, if the first DCI uses the CS-RNTI for scrambling and the second DCI uses the C-RNTI for scrambling, the terminal device can identify the second DCI scrambled with the C-RNTI as the target DCI.

Priorities of different scrambling modes (that is, different RNTIs) can be agreed in advance by the terminal device and the network side device.

Since data carried in the PDSCH which is scheduled by DCI scrambled with the MCS-C-RNTI is generally ultra reliable & low latency communication (URLLC) service, which has higher latency requirements than the enhanced mobile broadband (eMBB) service, thus, setting such DCI as the target DCI can guarantee the low latency of URLLC. The PDSCH which is scheduled by DCI scrambled with C-RNTI is data directly scheduled by the network device, and the PDSCH which is scheduled by DCI scrambled with CS-RNTI is generally data independently transmitted by the terminal device. The transmission reliability of the former one is higher, so setting the DCI of the former one as the target DCI can improve the overall transmission rate of the system.

Manner 9: the terminal device determines the target DCI according to a first time interval between receiving the first DCI and transmitting the first data channel and a second time interval between receiving the second DCI and transmitting the second data channel.

Specifically, the terminal device may determine, in the first time interval and the second time interval, a smaller or a larger time interval, and takes DCI corresponding to this time interval as the target DCI. For example, if the first time interval is smaller than the second time interval, the terminal device can select the first time interval which is a smaller time interval and determine the first DCI corresponding to the first time interval as the target DCI.

Manner 10: the terminal device determines the target DCI according to whether a BWP indicator in the first DCI indicating BWP switching and whether a BWP indicator in the second DCI indicating BWP switching.

Specifically, the terminal device determines whether BWP switching is needed according to the BWP indicator in the first DCI, determines whether BWP switching is needed according to the BWP indicator in the second DCI, and selects the DCI that does not require BWP switching as the target DCI.

For example, if the first DCI indicates BWP switching (that is, the BWP indicated by the first DCI is different from the currently activated BWP), and the second DCI does not indicate BWP switching (that is, the BWP indicated by the second DCI is the currently activated BWP), the terminal device takes the second DCI which does not indicate BWP switching as the target DCI. This avoids unnecessary BWP switching and ensures data continuity.

Manner 11: the terminal device determines the target DCI according to whether the first DCI including a BWP indicator and whether the second DCI including a BWP indicator.

Specifically, if the first DCI does not contain any BWP indicator, and the second DCI contains the BWP indicator, the terminal device can determine the first DCI which does not contain any BWP indicator as the target DCI. Alternatively, the terminal device can determine the second DCI containing the BWP indicator as the target DCI.

The first DC does not contain any BWP indicator, indicating that the first DCI adopts the currently activated BWP. The second DCI contains the BWP indicator, indicating that the second DCI adopts either the currently activated BWP or other BWPs. The embodiment of the present application is not limited to thereto.

Manner 12: the terminal device determines the target DCI according to an index or subcarrier interval of a BWP where the first is located or an index or subcarrier interval of a BWP where the second data channel is located.

For example, in the first BWP determined according to the first DCI and the second BWP determined according to the second DCI, the terminal device determines DCI corresponding to a BWP with a lower (or higher) index as the target DCI. For example, if the index of the first BWP is lower (or higher) than that of the second BWP, the terminal device determines the first DCI corresponding to the first BWP with a lower index as the target DCI.

For another example, in the first BWP determined according to the first DCI and the second BWP determined according to the second DCI, the terminal device determines DCI corresponding to a BWP with a lower (or higher) subcarrier interval as the target DCI. For example, if the subcarrier interval of the first BWP is lower (or higher) than that of the second BWP, the terminal device determines the first DCI corresponding to the first BWP with a lower subcarrier interval as the target DCI.

It should be understood that the above Manner 1 to Manner 12 can be used alone or in combination, for example using two or more manners, until the target DCI is determined. For example, the terminal device can first use the above Manner 7 to determine the target DC according to the formats of the DCI. If the formats of the DCI are the same, then use the above Manner 5 to determine the target DCI according to the sequence of the receiving times of the first DCI and the second DCI. For another example, the terminal device can first adopt the above Manner 8 to determine the target DCI according to the scrambling modes of CRC codes of the first DCI and the second DCI. If the scrambling modes of the CRC codes are the same, then use the above Manner 5 to determine the target DCI according to the formats of the DCI. If the formats of the DCI are the same, then adopt the above Manner 3 to determine the target DCI according to the CORESET ID.

Optionally, the second embodiment can be as follows: if the first BWP determined according to the first DCI is the same as the second BWP determined according to the second DCI, in S220, the terminal device can transmit the first data channel and the second data channel on the first BWP. Where the first data channel and the second data channel are both uplink channels or downlink channels.

Figure 8:
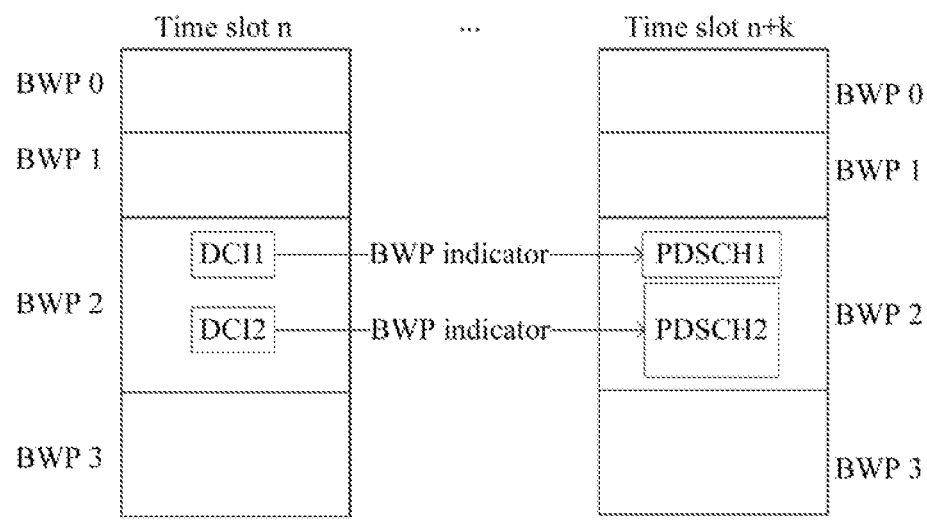
FIG. 8 is a schematic diagram of PDSCH transmission in a second embodiment of the present application.

For example, FIG. 8 is a schematic diagram of PDSCH transmission in the second embodiment. As shown in FIG. 8, the BWP indicator in DCI1 that schedules PDSCH1 indicates BWP1, and the BWP indicator in DCI2 that schedules PDSCH2 also indicates the same BWP1, so the terminal device receives PDSCH1 and PDSCH2 simultaneously in BWP1.

In the embodiment of the present application, Method 200 also includes: the terminal device determines that the first BWP is the same as the second BWP according to the first DCI and the second DCI. For example, if both the first DCI and the second DCI include BWP indicators, the terminal device determines the first BWP according to the BWP indicator in the first DCI, determines the second BWP according to the BWP indicator in the second DCI, and determines that the first BWP is the same as the second BWP.

For another example, if neither the first DCI nor the second DCI contains the BWP indicator, that is, the first DCI does not contain any BWP indicator and the second DCI does not contain any BWP indicator, the terminal device determines that the first BWP is the same as the second BWP, and that both the first BWP and the second BWP refer to the currently activated BWP.

For another example, if only one DCI in the first DCI and the second DCI contains the BWP indicator, that is, the first DCI does not contain any BWP indicator and the BWP indicator in the second DCI indicates the currently activated BWP, then the terminal device determines that the first BWP is the same as the second BWP, and that both the first BWP and the second BWP refer to the currently activated BWP.

The terminal device in the embodiment does not expect that the first BWP determined according to the first DCI to be different from the second BWP determined according to the second DCI. That is, the terminal device will only handle the case where the first BWP and the second BWP are the same, rather than the case where the first BWP and the second BWP are different.

Specifically, if both the first DCI and the second DCI contain BWP indicators, the terminal device does not expect that the BWP indicators included in the first BWP and the second BWP indicate different BWPs. Therefore, the network side device needs to carry the same BWP indicator in the first DCI and the second DCI. Otherwise, the terminal device can treat this as an error case and does not need to transmit the first data channel and the second data channel.

Similarly, the terminal device does not expect that the first DCI contains no BWP indicator while the second DCI contains a BWP indicator indicating BWP switching, namely, the BWP indicator in the second DCI indicates a BWP that is different from the currently activated BWP. If this happens, the terminal device can treat this as an error case and does not need to transmit the first data channel and the second data channel.

In the second embodiment, if the first data channel and the second data channel are both PDSCHs, the ACK/NACK information of the first data channel and the second data channel is also transmitted in the same uplink BWP. For example, the terminal device can determine, based on the first DCI, the uplink BWP for transmitting the ACK/NACK information of the first data channel and determine, based on the second DCI, the uplink BWP for transmitting the ACK/NACK information of the second data channel. The two uplink BWPs are also the same. The terminal device uses the same BWP to send the ACK/NACK information of the first data channel and the ACK/NACK information of the second data channel.

Optionally, as the third embodiment, in a case where the first BWP determined according to the first DCI is different from the second BWP determined according to the second DCI, in S220, the terminal device determines the first DCI or the second DCI as the target DCI. And the terminal device only transmits the data channel scheduled by the target DCI on the target BWP determined according to the target DCI. The terminal device will transmit only one data channel at this time, that is, the data channel scheduled by the target DCI.

For example, if the terminal device determines the first DCI as the target DCI, it transmits the first data channel scheduled by the first DCI only on the first BWP determined based on the first DCL. In other words, the terminal device does not transmit the second data channel scheduled by the second DCI, that is, the second DCI is invalid DCI. Correspondingly, if the second data channel is a PDSCH, the terminal device will not feed back ACK/NACK information of the PDSCH scheduled by the second DCI, or the terminal device will feed back NACK in ACK/NACK information corresponding to the PDSCH.

In the embodiment of the present application. Method 200 also includes: the terminal device determines that the first BWP is different from the second BWP based on the first DCI and the second DCI. For example, if both the first DCI and the second DCI both include BWP indicators, the terminal device determines the first BWP based on the BWP indicator in the first DCI, determines the second BWP based on the BWP indicator in the second DCI, and then determines that the first BWP is different from the second BWP.

Again, for example, if only one DCI in the first DCI and second DCI contains the BWP indicator, for example, the first DC does not contain any BWP indicator and the BWP indicator in the second DCI indicates BWP switching, the terminal device determines that the first BWP is different from the second BWP, where the first BWP represents the currently activated BWP and the second BWP represents other BWPs.

The terminal device in the embodiment of the present application may take one or more ways to determine the target DCI from the first DCI and the second DCI. For example, the terminal device may determine the target DCI by adopting any one or more of Manner 1 to Manner 12 in the first embodiment above, which will not be described here for brevity.

In addition, the terminal device may determine the target DCI in other ways. For example, the terminal device may use one or more of the other ways, or it may use one or more of the above twelve manners in combination with one or more of the other manners. There are cases that the first BWP determined according to the first DCI is different from the second BWP determined according to the second DCI, including the case where the first BWP is an uplink BWP and the second BWP is a downlink BWP. For example, the first DCI is configured to schedule PUSCH transmissions and the second DCI is configured to schedule PDSCH transmissions. In this case, the terminal device can only select one BWP from the first BWP and the second BWP for data transmission. Therefore, the terminal device can also determine the first DCI or the second DCI as the target DCI according to the link direction of the first data channel and the link direction of the second data channel.

Specifically, the link direction is either uplink or downlink. For example, if the first DC schedules a downlink channel, e.g., the first DCI schedules PDSCH transmissions, and the second DCI schedules an uplink channel, e.g., the second DCI schedules PUSCH transmissions, the terminal device may determine the first DCI which schedules PDSCHs as the target DCI, or determine the second DCI which schedules PUSCHs as the target DCI.

It should be understood that the terminal device determines either the first DCI or the second DCI as the target DCI. Meanwhile, the terminal device can also determine the corresponding target BWP based on the target DCI so that it can send the data channel corresponding to the target DCI on the target BWP. Specifically, the terminal device can determine the target BWP according to the BWP indicator in the target DCI. Alternatively, if the target DCI does not contain any BWP indicator, the terminal device determines the currently activated BWP as the target BWP.

Several cases of the third embodiment are described in detail below in conjunction with the accompanying drawings.

Figure 9:
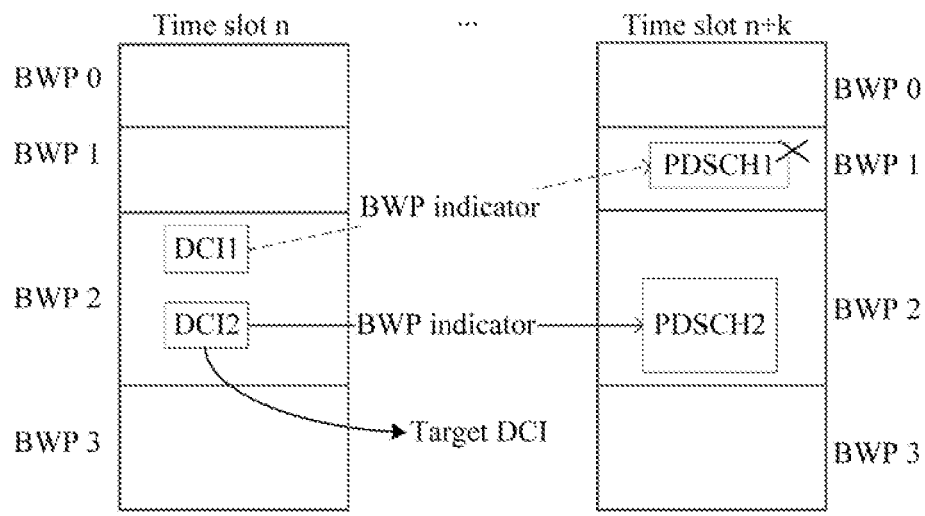
FIG. 9 is a schematic diagram of PDSCH transmission in a third embodiment of the present application.

Example 1: as shown in FIG. 9, both DCI1 and DCI2 contain BWP indicators, but their BWP indicators in DCI1 and DCI2 indicate different BWPs, that is, the BWP indicator in DCI1 indicates BWP1, and the BWP indicator in DCI2 indicates BWP2. Assuming that the terminal device determines DCI2 as the target DCI, the terminal device only receives PDSCH2 scheduled by DCI2 on BWP2 and does not receive PDSCH1 scheduled by DCI1.

Figure 10:
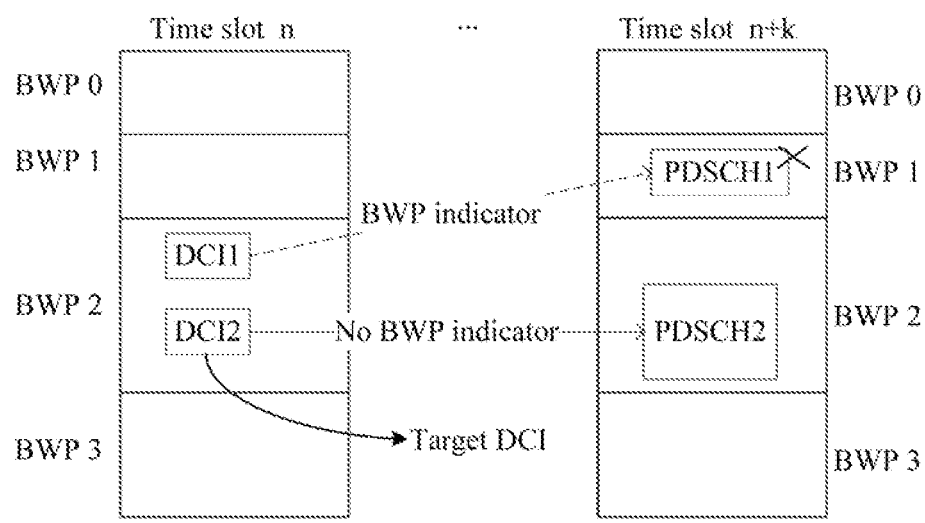
FIG. 10 is another schematic diagram of PDSCH transmission in the third embodiment of the present application.

Example 2: as shown in FIG. 10, only DCI1 contains the BWP indicator, and the BWP indicator in DCI1 indicates BWP switching. DCI2 does not contain any BWP indicator, that is, DCI2 corresponds to the currently activated BWP2. Assuming that DCI2 is the target DCI, the terminal device only receives PDSCH2 scheduled by DCI2 on BWP2 and does not receive PDSCH1 scheduled by DCI1.

Figure 11:
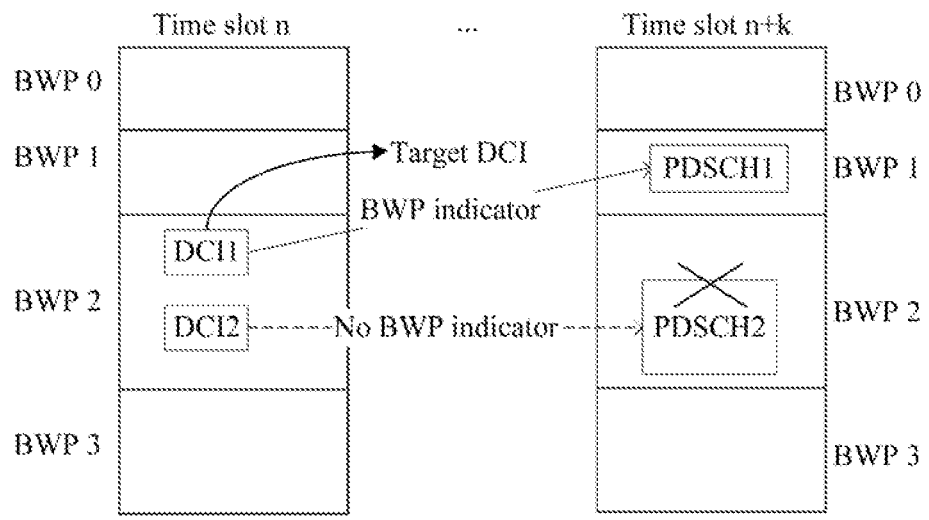
FIG. 11 is a further schematic diagram of PDSCH transmission in the third embodiment of the present application.

Example 3: as shown in FIG. 11, only DCI1 contains the BWP indicator, and the BWP indicator in DCI1 indicates BWP switching, while DCI2 does not contain any BWP indicator, that is, DCI2 corresponds to the currently activated BWP2. Assuming that DCI1 is the target DCI, the terminal device only receives PDSCH1 scheduled by DCI1 on BWP1 and does not receive PDSCH2 scheduled by DCI2.

It should be understood that in the third embodiment, for the case in which the first BWP is different from the second BWP, in addition to determining the target DC and using the target DCI to send only the corresponding data channel, the terminal device can also treat the case as an error case and does not need to transmit the first data channel and the second data channel.

It should be understood that in the embodiment of the present application, the candidate BWP sets corresponding to the BWP indicators in the first DCI and the second DCI are the same, that is, the first BWP determined according to the first DCI belongs to the same candidate BWP set as the second BWP determined according to the second DCI. Specifically, N BWPs are pre-configured through RRC signaling by the network side, and then each of the BWPs is indicated by the BWP indicators in the first DCI and the second DCI respectively, that is, the two BMP indicators respectively indicate BWPs from the same BWP set. At this point, the length of the BWP indicator in the first DCI and the length of the BWP indicator in the second DCI is the same, and the BWPs indicated by the same value are also the same.

As a result, according to the data channel transmission method in the embodiment of the present application, in a scenario such as incoherent transmission, when the terminal device is scheduled to send and/or receive two data channels simultaneously, it determines on which BWP to send or receive the data channels according to at least one DCI of the two DCI that schedule the two data channels respectively. According to one of the DCI, the terminal device can simultaneously determine the BWPs used for transmission of the two data channels, or simply receive or send the data channel scheduled by the DCI with a higher priority when the BWPs determined by the two pieces of DCI are different. In this way, the terminal device only needs to send or receive one or more data channels on one BWP, and it is not necessary for the terminal device to send or receive signals on multiple BWPs at the same time, thus reducing the implementation complexity of the terminal device and ensuring that the data channel which is more important can be preferentially transmitted In the above embodiment, the first DCI and the second DCI can be configured not only to schedule data channels, but also to schedule reference signals or to schedule control channels respectively. When the first DCI and the second DCI are configured to schedule uplink or downlink reference signals or uplink control channels, the method in the embodiment of the present application may also be used for determining a target BWP for transmitting the scheduled reference signals or control channels. For example, use the same BWP to transmit two reference signals (control channels), or use the target BWP determined according to the target DCI to transmit one of the reference signals (control channels). That is, the method in the present application is not limited to data channels but can also be used for reference signals and control channels.

It should be understood that the sequence number of the above procedures does not imply the execution order, the execution order shall be determined by their functions and internal logics and shall not constitute any limitation on the implementation procedures of the embodiments of the present application.

In addition, the term "and/or" indicates relationships between associated objects, which describes three relations. For example, A and/or B can mean that only A is available, both A and B are available, and only B is available. In addition, the character "/" used here generally indicates that the objects before and after "/" is in an OR relationship.

The above content combines FIG. 1 through FIG. 11 to illustrate the data channel transmission method according to the embodiments of the application. In the following, terminal devices of embodiments of the present application is described by combining FIG. 12 through FIG. 15.

Figure 12:
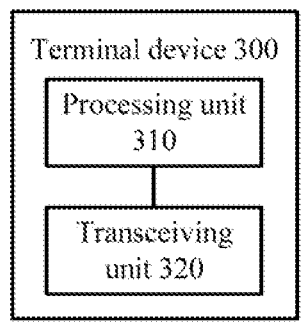
FIG. 12 is a schematic block diagram of a terminal device provided by an embodiment of the present application.

As shown in FIG. 12, a terminal device 300 of the embodiments of the present application includes: a processing unit 310 and a transceiving unit 320. Specifically, the transceiving unit is configured to receive first DCI and second DCI. The first DCI is configured to schedule a first data channel, and the second DCI is configured to schedule a second data channel. The first DCI, the second DCI, the first data channel, and the second data channel satisfy one of the following conditions: the first data channel and the second data channel are scheduled on a same time domain resource, a time interval between the first data channel and the second data channel is less than a first preset value, the first DCI and the second DCI are transmitted on a same time domain resource, a transmission time interval between the first DCI and the second DCI is less than a second preset value: transmit the first data channel and/or the second data channel on a bandwidth part BWP determined according to at least one DCI of the first DCI and the second DCI.

Optionally, as an embodiment, the first DCI and the second DCI are associated with different control-resource sets CORESET, and/or, a search space where the first DCI is located is different from a search space where the second DCI is located.

Optionally, as an embodiment, the first data channel and the second data channel are both uplink channels or downlink channels.

Optionally, as an embodiment, the processing unit 310 is configured to determine the first DCI or the second DCI as a target DCI. The transceiving unit 320 is configured to transmit the first data channel and the second data channel on a target BWP determined according to the target DCI.

Optionally, as an embodiment, the processing unit 310 is configured to determine, in the first DCI and the second DCI, DCI corresponding to a preset CORESET as the target DCI.

Or, the processing unit 310 is configured to determine the first DCI or the second DCI as the target DCI according to at least one of the following information: configuration information of a CORESET associated with the first DCI and configuration information of a CORESET associated with the second DCI, an identifier or index of the CORESET associated with the first DCI and an identifier or index of the CORESET associated with the second DCI, an identifier or index of a search space where the first DCI is located and an identifier or index of a search space where the second DCI is located, a time sequence of receiving the first DCI and the second DCI by the transceiving unit 320, a time sequence of transmitting the first data channel and transmitting the second data channel, a format of the first DCI and a format of the second DCI, scrambling modes of CRC codes of the first DCI and the second DCI, a first time interval between receiving the first DCI and transmitting the first data channel and a second time interval between receiving the second DCI and transmitting the second data channel, whether a BWP indicator in the first DCI indicates BWP switching and whether a BWP indicator in the second DCI indicates BWP switching, whether the first DCI includes a BWP indicator and whether the second DCI includes a BWP indicator, an index or subcarrier interval of a BWP where the first data channel is located and an index or subcarrier interval of a BWP where the second data channel is located.

Optionally, in an embodiment, the first data channel and the second data channel are both PDSCHs, the processing unit 310 is configured to determine a feedback BWP according to the target DCI, and the transceiving unit 320 is configured to send, on the feedback BWP, acknowledgment/negative acknowledgment ACK/NACK information of the first data channel and ACK/NACK information of the second data channel.

Optionally, in an embodiment, a first BWP determined according to the first DCI is the same as a second BWP determined according to the second DCI, and the transceiving unit 320 is configured to transmit the first data channel and the second data channel on the first BWP.

Optionally, in an embodiment, the first data channel and the second data channel are both PDSCHs, and the transceiving unit 320 is configured to send ACK/NACK information of the first data channel and ACK/NACK information of the second data channel on the same BWP.

Optionally, in an embodiment, the processing unit 310 is configured to: determine the first BWP according to BWP information in the first DCI, determine the second BWP according to BWP information in the second DCI, and determine that the first BWP is the same as the second BWP: or, if the first DCI does not include a BWP indicator and the second DCI does not include a BWP indicator, determine that the first BWP is the same as the second BWP; or, if the first DCI does not include BWP information and BWP information in the second DCI indicates a currently activated BWP, determine that the first BWP is the same as the second BWP.

Optionally, in an embodiment, the first BWP determined according to the first DCI is different from the second BWP determined according to the second DCI. The processing unit 310 is configured to determine the first DCI or the second DCI as a target DCI. The transceiving unit 320 is configured to transmit a data channel scheduled by the target DCI only on a target BWP determined according to the target DCI.

Optionally, in an embodiment, the processing unit 310 is configured to determine, in the first DCI and the second DCI, DCI corresponding to a preset CORESET as the target DCI.

Or, determine the first or second DCI as the target DCI according to at least one of the following information: configuration information of a CORESET associated with the first DCI and configuration information of a CORESET associated with the second DCI, an identifier or index of the CORESET associated with the first DCI and an identifier or index of the CORESET associated with the second DCI, an identifier or index of a search space where the first DCI is located and an identifier or index of a search space where the second DCI is located, a time sequence of receiving the first DCI and the second DCI by the transceiving unit 320, a time sequence of transmitting the first data channel and transmitting the second data channel, a format of the first DCI and a format of the second DCI, scrambling modes of CRC codes of the first DCI and the second DCI, a first time interval between receiving the first DCI and transmitting the first data channel and a second time interval between receiving the second DCI and transmitting the second data channel, whether a BWP indicator in the first DCI indicates BWP switching and whether a BWP indicator in the second DCI indicates BWP switching, whether the first DCI includes a BWP indicator and whether the second DCI includes a BWP indicator, an index or subcarrier interval of a BWP where the first data channel is located and an index or subcarrier interval of a BWP where the second data channel is located, a link direction of the first data channel and a link direction of the second data channel.

Optionally, in an embodiment, the processing unit 310 is configured to: if the target DCI is the first DCI, determine not to transmit the second data channel scheduled by the second DCI.

Optionally, in an embodiment, the processing unit 310 is configured to: if the target DCI is the first DCI, determine not to feed back ACK/NACK information corresponding to the second data channel; or, determine to feed back NACK in ACK/NACK information corresponding to the second data channel.

Optionally, in an embodiment, the processing unit 310 is configured to: determine the first BWP according to BWP information in the first DCI, determine the second BWP according to BWP information in the second DCI, and determine that the first BWP is different from the second BWP; or, if the first DCI does not include BWP information and BWP information in the second DCI indicates BWP switching, determine that the first BWP is different from the second BWP.

Optionally, in an embodiment, the processing unit 310 is configured to: determine the target BWP according to BWP information in the target DCI; or, determine a currently activated BWP as the target BWP if the target DCI does not include BWP information.

Optionally, in an embodiment, the time domain resource is a time slot or an OFDM symbol.

Optionally, in an embodiment, the first preset or the second preset value is the shortest length of time required for the terminal device to switch a BWP.

Optionally, in an embodiment, the first BWP determined according to the first DCI and the second BWP determined according to the second DCI belong to a same candidate BWP set.

It should be understood that the terminal device 300 in the embodiments of the present application may correspondingly execute the method 200 in the embodiments of the present application, and the above and other operations and/or functions of each unit in the terminal device 300 accomplish corresponding flowcharts of the terminal device shown in FIG. 1 to FIG. 11, which will not be repeated herein.

Therefore, when the terminal device in the embodiment of the present application is scheduled to send and/or receive two data channels simultaneously in a scenario such as incoherent transmission, it determines on which BWP to send or receive the data channels according to at least one DCI of the two DCI that schedule the two data channels respectively. According to one of the DCI, the terminal device can simultaneously determine the BWPs used for transmission of the two data channels, or only receive or send the data channel scheduled by the DCI with a higher priority when the BWPs determined by the two pieces of DCI are different. In this way, the terminal device only needs to send or receive one or more data channels on one BWP, and it is not necessary for the terminal device to send or receive signals on multiple BWPs at the same time, thus reducing the implementation complexity of the terminal device and ensuring that the data channel which is more important can be preferentially transmitted.

Figure 13:
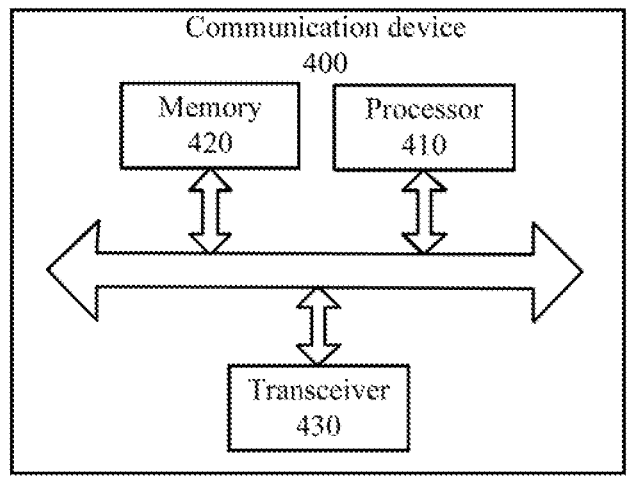
FIG. 13 is a schematic block diagram of a communication device provided by an embodiment of the present application.

FIG. 13 is a schematic structural diagram of a communication device 400 provided by an embodiment of the present application. The communication device 400 shown in FIG. 13 includes a processor 410, which can call and run a computer program from a memory to implement the method according to the embodiment of the present application.

Optionally, as shown in FIG. 13, the communication device 400 may further include a memory 420. The processor 410 may call and run a computer program from the memory 420 to implement the method according to the embodiment of the present application.

The memory 420 may be a separate device independent of the processor 410, or may be integrated in the processor 410.

Optionally, as shown in FIG. 13, the communication device 400 may further include a transceiver 430, and the processor 410 may control the transceiver 430 to communicate with other devices. Specifically, it may send information or data to other devices, or receive information or data sent by the other devices.

The transceiver 430 may include a transmitter and a receiver. The transceiver 430 may further include an antenna, and the number of antennas may be one or more.

Optionally, the communication device 400 may specifically be a network device in an embodiment of the present application, and the communication device 400 may implement the corresponding process implemented by the network device in each method of the embodiment of the present application, which will not be repeated for the sake of conciseness.

Optionally, the communication device 400 may specifically be a mobile terminal/terminal device of an embodiment of the application, and the communication device 400 may implement the corresponding processes implemented by the mobile terminal/terminal device in each method of the embodiment of the application, which will not be repeated for the sake of conciseness.

Figure 14:
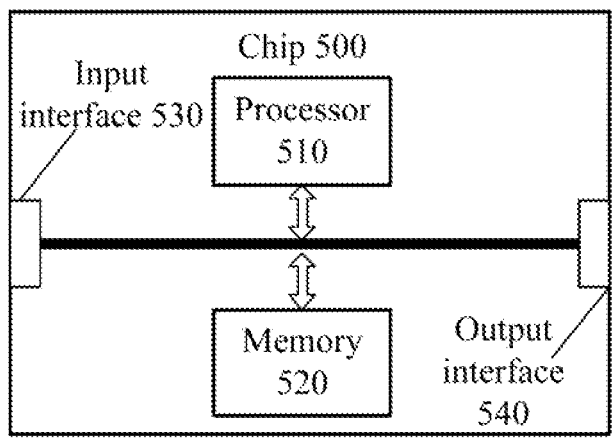
FIG. 14 is a schematic block diagram of a chip provided by an embodiment of the present application.

FIG. 14 is a schematic structural diagram of a chip provided by an embodiment of the present application. The chip 500 shown in FIG. 14 includes a processor 510, and the processor 510 can call and run a computer program from a memory to implement the method according to the embodiment of the present application.

Optionally, as shown in FIG. 14, the chip 500 may further include a memory 520. The processor 510 may call and run a computer program from the memory 520 to implement the method according to the embodiment of the present application.

The memory 520 may be a separate device independent of the processor 510, or may be integrated in the processor 510.

Optionally, the chip 50) may further include an input interface 530. The processor 510 can control the input interface 530 to communicate with other devices or chips, and specifically, can acquire information or data sent by other devices or chips.

Optionally, the chip 500 may further include an output interface 540. The processor 510 can control the output interface 540 to communicate with other devices or chips, and specifically, can output information or data to other devices or chips.

Optionally, the chip can be applied to the network device in the embodiment of the present application, and the chip can implement the corresponding process implemented by the network device in each method of the embodiment of the present application, which will not be repeated for the sake of conciseness.

Optionally, the chip can be applied to the mobile terminal/terminal device in the embodiment of the present application, and the chip can implement the corresponding process implemented by the mobile terminal/terminal device in each method of the embodiment of the present application, which will not be repeated for the sake of conciseness.

It should be understood that the chip mentioned in the embodiment of the present application may also be referred to as a system-level chip, a system-on-chip, a system-on-chip, or a system-on-chip, etc.

Figure 15:
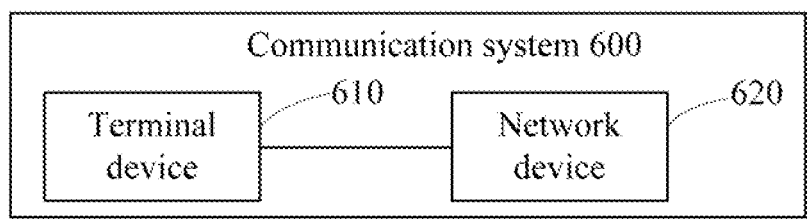
FIG. 15 is a schematic diagram of a communication system provided by an embodiment of the present application.

FIG. 15 is a schematic block diagram of a communication system 600 according to an embodiment of the present application. As shown in FIG. 15, the communication system 600 includes a terminal device 610 and a network device 620.

The terminal device 610 may be configured to implement the corresponding function implemented by the terminal device in the foregoing method, and the network device 620 may be configured to implement the corresponding function implemented by the network device in the foregoing method, which will not be repeated for the sake of conciseness.

It should be understood that the processor of the embodiment of the present application may be an integrated circuit chip with a signal processing capability. In the implementation process, the steps of the foregoing method embodiments can be completed by an integrated logic circuit of hardware in the processor or by instructions in the form of software. The above-mentioned processor can be a general purpose processor, a digital signal processor (DSP), an application specific integrated circuit (ASIC), a field programmable gate array (FPGA) or other programming logic devices, discrete gates or transistor logic devices, discrete hardware components. The methods, steps, and logical block diagrams disclosed in the embodiments of the present application can be implemented or executed. The general purpose processor may be a microprocessor or the processor may also be any conventional processor or the like. The steps of the method disclosed in the embodiments of the present application can be directly embodied as being executed and completed by a hardware decoding processor, or executed and completed by a combination of hardware and software modules in the decoding processor. The software module can be located in a mature storage medium in the field such as a random access memory, a flash memory, a read-only memory, a programmable read-only memory, or an electrically erasable programmable memory, a register. The storage medium is located in the memory, and the processor reads the information in the memory and completes the steps of the above method in combination with its hardware.

It can be understood that the memory in the embodiments of the present application may be a volatile memory or a non-volatile memory, or may include both the volatile memory and the non-volatile memory. Where the non-volatile memory can be a read-only memory (ROM), a programmable read-only memory (PROM), an erasable programmable read-only memory (EPROM), and an electrically programmable read-only memory (EEPROM) or a flash memory. The volatile memory may be a random access memory (RAM), which is used as an external cache. By way of example rather than limiting illustration, many forms of RAM are available, such as a static random access memory (SRAM), a dynamic random access memory (DRAM), a synchronous dynamic random access memory (SDRAM), a double data rate SDRAM (DDR SDRAM), an enhanced synchronous dynamic random access memory (ESDRAM), a synchronous link dynamic random access memory (SLDRAM)) and a direct rambus RAM (DR RAM). It should be noted that the memories of the systems and methods described herein are intended to include, but are not limited to, these and any other suitable types of memories.

It should be understood that the above-mentioned memory is exemplary but not restrictive, for example, the memory in the embodiment of the present application may also be a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous connection dynamic random access memory (SLDRAM), a direct rambus random access memory (DR RAM), etc. That is, the memory in the embodiments of the present application is intended to include, but not limited to, these and any other suitable types of memory.

The embodiments of the present application also provide a computer-readable storage medium for storing a computer program.

Optionally, the computer-readable storage medium can be applied to the network device in the embodiment of the present application, and the computer program causes the computer to execute the corresponding processes implemented by the network device in each method of the embodiment of the present application, which will not be repeated herein for brevity.

Optionally, the computer-readable storage medium may be applied to the mobile terminal/terminal device in the embodiment of the present application, and the computer program enables the computer to execute the corresponding processes implemented by the mobile terminal/terminal device in each method in the embodiments of the present application, which will not be repeated herein for brevity.

The embodiments of the present application also provide a computer program product, including computer program instructions.

Optionally, the computer program product can be applied to the network device in the embodiment of the present application, and the computer program instructions cause the computer to execute the corresponding processes implemented by the network device in each method of the embodiment of the present application, which will not be repeated herein for brevity.

Optionally, the computer program product can be applied to the mobile terminal/terminal device in the embodiment of the present application, and the computer program instructions cause the computer to execute the corresponding processes implemented by the mobile terminal/terminal device in each method of the embodiment of the present application, which will not be repeated herein for brevity.

The embodiments of the present application also provide a computer program.

Optionally, the computer program can be applied to the network device in the embodiment of the present application. When the computer program runs on a computer, it causes the computer to execute the corresponding processes implemented by the network device in each method of the embodiment of the present application, which will not be repeated herein for brevity.

Optionally, the computer program can be applied to the mobile terminal/terminal device in the embodiment of the present application. When the computer program runs on a computer, it causes the computer to execute the corresponding processes implemented by the mobile terminal/terminal device in each method of the embodiment of the present application, which will not be repeated herein for brevity.

Those of ordinary skill in the art will appreciate that the units and algorithm steps of the examples described in combination with the embodiments disclosed herein can be implemented by electronic hardware or a combination of computer software and electronic hardware. Whether these functions are executed by hardware or software depends on the specific application and design constraints of the technical solution. The professional technicians can use different methods for each specific application to implement the described functions, but such implementation should not be considered to be beyond the scope of the present application.

Those skilled in the art can clearly understand that, for convenience and concise description, the specific working process of the above-described system, device, and unit can refer to the corresponding processes in the foregoing method embodiments, and will not be repeated herein.

In the several embodiments provided by the present application, it should be understood that the disclosed system, device, and method may be implemented in other ways. For example, the device embodiments described above are merely illustrative. For example, the division of the units is only a logical function division, and there may be other divisions in actual implementation. For example, multiple units or components may be combined or be integrated into another system, or some features can be ignored or not implemented. In addition, coupling or direct coupling or communication connections shown or discussed herein may be indirect coupling or communication connections through some interfaces, devices or units, and may be in electrical, mechanical or other forms.

The units described as separate components may or may not be physically separate. The components displayed as units may or may not be physical units, that is, they may be located in one place, or may be distributed to multiple network units. Some or all of the units may be selected according to actual needs to achieve the objectives of the solutions of the embodiments.

In addition, the functional units in the various embodiments of the present application may be integrated into one processing unit, or each unit may exist alone, physically, or two or more units may be integrated into one unit.

If the functions are implemented in the form of a software functional unit and sold or used as independent products, they can be stored in a computer readable storage medium. Based on this understanding, the technical solution of the present application, or the part contributing to the existing technology or the part of the technical solution can be embodied, in essence, in the form of a software product. The computer software product is stored in a storage medium and includes instructions for enabling a computer device (which may be a personal computer, a server, or a network device, etc.) to perform all or part of the steps of the methods described in the various embodiments of the present application. The aforementioned storage media includes various media that can store program code, such as a USB flash disk, a mobile hard disk, a read-only memory (ROM), a random access memory (RAM), a magnetic disk or an optical disk.

The above is only a specific implementation form of the present application, the protection scope of the present application is not limited thereto, and changes or substitutions that can easily be thought of by those skilled in the art within the technical scope disclosed in the present application should be covered by the scope of protection of the present application. Therefore, the scope of protection of the present application should be subject to the scope of protection of the claims.

What is claimed is:

1. A data channel transmission method, comprising:
    receiving, by a terminal device, first downlink control information (DCI) and second DCI, wherein the first DCI is configured to schedule a first data channel, and the second DCI is configured to schedule a second data channel, wherein the first DCI and the second DCI are associated with different control-resource sets (CORESET); a time domain resource of the first data channel and a time domain resource of the second data channel are partially overlapped or completely overlapped;
    if a first bandwidth part (BWP) determined according to the first DCI is different from a second BWP determined according to the second DCI, not transmitting or receiving, by the terminal device, the first data channel and the second data channel; and
    if a first BWP determined according to the first DCI is the same as a second BWP determined according to the second DCI, transmitting or receiving, by the terminal device, the first data channel the second data channel on a BWP determined according to the first DCI and the second DCI.

2. The method according to claim 1, wherein a search space where the first DCI is located is different from a search space where the second DCI is located.

3. The method according to claim 1, wherein the first data channel and the second data channel are both uplink channels or downlink channels.

4. The method according to claim 3, wherein the transmitting or receiving, by the terminal device, the first data channel and the second data channel on a BWP determined according to the first DCI and the second DCI, comprises:
    determining, by the terminal device, the first DCI or the second DCI as a target DCI; and transmitting or receiving, by the terminal device, the first data channel and the second data channel on a target BWP determined according to the target DCI.

5. The method according to claim 4, wherein the determining, by the terminal device, the first DCI or the second DCI as a target DCI, comprises:
determining, by the terminal device in the first DCI and the second DCI, DCI corresponding to a preset CORESET as the target DCI; or,
determining, by the terminal device, the first DCI or the second DCI as the target DCI according to at least one of following information:
configuration information of a CORESET associated with the first DCI and configuration information of a CORESET associated with the second DCI,
an identifier or index of the CORESET associated with the first DC and an identifier or index of the CORESET associated with the second DCI,
an identifier or index of a search space where the first DCI is located and an identifier or index of a search space where the second DCI is located,
a time sequence of receiving the first DCI and the second DCI by the terminal device,
a time sequence of transmitting or receiving the first data channel and transmitting or receiving the second data channel,
a format of the first DC and a format of the second DCI,
scrambling modes of cyclic redundancy check (CRC) codes of the first DCI and the second DCI,
a first time interval between receiving the first DCI and transmitting or receiving the first data channel and a second time interval between receiving the second DCI and transmitting or receiving the second data channel,
whether a BWP indicator in the first DCI indicates BWP switching and whether a BWP indicator in the second DCI indicates BWP switching,
whether the first DCI comprises a BWP indicator and whether the second DCI comprises a BWP indicator,
an index or subcarrier interval of a BWP where the first data channel is located and an index or subcarrier interval of a BWP where the second data channel is located.

6. The method according to claim 4, wherein the first data channel and the second data channel are both physical downlink shared channels (PDSCH), and the method further comprises:
determining, by the terminal device, a feedback BWP according to the target DCI; and
sending, by the terminal device on the feedback BWP, acknowledgment/negative acknowledgment (ACK/NACK) information of the first data channel and ACK/NACK information of the second data channel.

7. The method according to claim 4, wherein the method further comprises:
determining, by the terminal device, the target BWP according to a BWP indicator in the target DCI; or,
if the target DCI does not comprise a BWP indicator, determining, by the terminal device, a currently activated BWP as the target BWP.

8. The method according to claim 3, wherein
the transmitting or receiving, by the terminal device, the first data channel and the second data channel on a BWP determined according to the first DCI and the second DCI comprises:
transmitting or receiving, by the terminal device, the first data channel and the second data channel on the first BWP.

9. The method according to claim 8, wherein the first data channel and the second data channel are both physical downlink shared channels (PDSCH), and the method further comprises:
sending, by the terminal device on the same BWP, acknowledgment/negative acknowledgment (ACK/NACK) information of the first data channel and ACK/NACK information of the second data channel.

10. The method according to claim 8, wherein the method further comprises:
determining, by the terminal device, the first BWP according to a BWP indicator in the first DCI, determining the second BWP according to a BWP indicator in the second DCI, and determining, by the terminal device, that the first BWP is the same as the second BWP; or,
if the first DC does not comprise a BWP indicator and the second DCI does not comprise a BWP indicator, determining, by the terminal device that the first BWP is the same as the second BWP; or,
if the first DC does not comprise a BWP indicator and a BWP indicator in the second DCI indicates a currently activated BWP, determining, by the terminal device that the first BWP is the same as the second BWP.

11. A terminal device, comprising: a processor, a memory and a transceiver, wherein the memory is configured to store a computer program, and the processor is configured to call and run the computer program stored in the memory to control the transceiver to:
receive first downlink control information (DCI) and second DCI, wherein the first DCI is configured to schedule a first data channel, and the second DCI is configured to schedule a second data channel, wherein the first DCI and the second DCI are associated with different control-resource sets (CORESET); a time domain resource of the first data channel and a time domain resource of the second data channel are partially overlapped or completely overlapped;
if a first bandwidth part (BWP) determined according to the first DC is different from a second BWP determined according to the second DCI, not transmit or receive the first data channel and the second data channel; and
if a first BWP determined according to the first DCI is the same as a second BWP determined according to the second DCI, transmit or receive the first data channel and the second data channel on a BWP determined according to the first DC and the second DCI.

12. The terminal device according to claim 11, wherein a search space where the first DCI is located is different from a search space where the second DCI is located.

13. The terminal device according to claim 11, wherein the first data channel and the second data channel are both uplink channels or downlink channels.

14. The terminal device according to claim 13, wherein the processor is configured to determine the first DCI or the second DCI as a target DCI;
the transceiver is configured to transmit or receive the first data channel and the second data channel on a target BWP determined according to the target DCI.

15. The terminal device according to claim 14, wherein the processor is configured to:
determine, in the first DC and the second DCI, DC corresponding to a preset CORESET as the target DCI; or,
determine the first DCI or the second DCI as the target DCI according to at least one of following information:

configuration information of a CORESET associated with the first DCI and configuration information of a CORESET associated with the second DCI, an identifier or index of the CORESET associated with the first DCI and an identifier or index of the CORESET associated with the second DCI, an identifier or index of a search space where the first DCI is located and an identifier or index of a search space where the second DCI is located, a time sequence of receiving the first DCI and the second DCI by the transceiver, a time sequence of transmitting or receiving the first data channel and transmitting or receiving the second data channel, a format of the first DCI and a format of the second DCI, scrambling modes of cyclic redundancy check CRC codes of the first DCI and the second DCI, a first time interval between receiving the first DCI and transmitting or receiving the first data channel and a second time interval between receiving the second DCI and transmitting or receiving the second data channel, whether a BWP indicator in the first DCI indicates BWP switching and whether a BWP indicator in the second DCI indicates BWP switching, whether the first DCI comprises a BWP indicator and whether the second DCI comprises a BWP indicator, an index or subcarrier interval of a BWP where the first data channel is located and an index or subcarrier interval of a BWP where the second data channel is located.

16. The terminal device according to claim 14, wherein the first data channel and the second data channel are both physical downlink shared channels (PDSCH), and the processor is configured to:

determine a feedback BWP according to the target DCI; the transceiver is configured to:

send, on the feedback BWP, acknowledgment/negative acknowledgment (ACK/NACK) information of the first data channel and ACK/NACK information of the second data channel.

17. The terminal device according to claim 14, wherein the processor is configured to:

determine the target BWP according to a BWP indicator in the target DCI; or, if the target DC does not comprise a BWP indicator, determine a currently activated BWP as the target BWP.

18. The terminal device according to claim 13, wherein if a first BWP determined according to the first DC is the same as a second BWP determined according to the second DCI, the transceiver is configured to:

transmit or receive the first data channel and the second data channel on the first BWP.

19. The terminal device according to claim 18, wherein the first data channel and the second data channel are both physical downlink shared channels (PDSCH), and the transceiver is configured to:

send acknowledgment/negative acknowledgment (ACK/NACK) information of the first data channel and ACK/NACK information of the second data channel on the same BWP.

20. The terminal device according to claim 18, wherein the processor is configured to:

determine the first BWP according to a BWP indicator in the first DCI, determine the second BWP according to a BWP indicator in the second DCI, and determine that the first BWP is the same as the second BWP; or, if the first DCI does not comprise a BWP indicator and the second DCI does not comprise a BWP indicator, determine that the first BWP is the same as the second BWP; or, if the first DCI does not comprise a BWP indicator and a BWP indicator in the second DCI indicates a currently activated BWP, determine that the first BWP is the same as the second BWP.

\* \* \* \* \*